Figure 1:
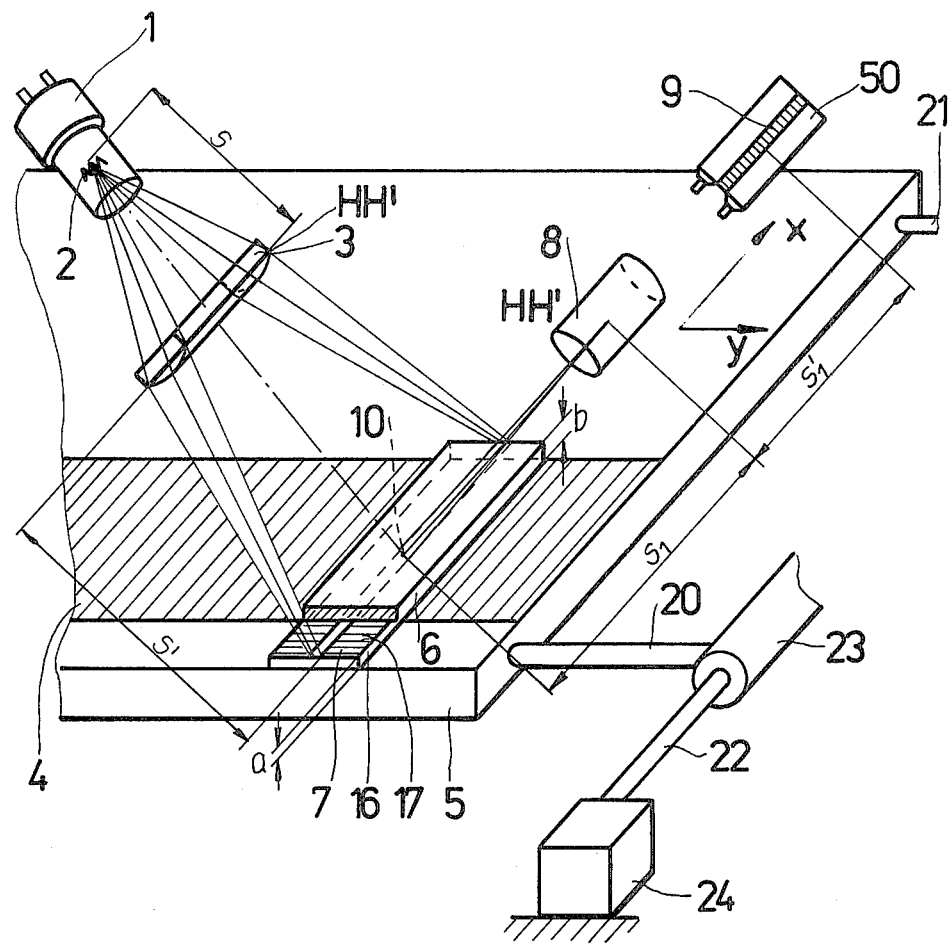

United States Patent [19]

Brandt et al.

[11] Patent Number: 4,474,470

[45] Date of Patent: Oct. 2, 1984

[54] ARRANGEMENT FOR COLOR DETECTION IN MAP-PLOTTING OR OTHER PRINTED MATERIALS

[76] Inventors: Udo Brandt, 60, Strasse d. Bergmanns; Christhard Deter, 27, Brehmstrasse, both of Gera, German Democratic Rep.

[21] Appl. No.: 229,356

[22] Filed: Jan. 29, 1981

[30] Foreign Application Priority Data

Feb. 1, 1980 [DD] German Democratic Rep. ... 218798

[51] Int. Cl.³ .............................................. G01J 3/50
[52] U.S. Cl. ..................................... 356/408; 356/425
[58] Field of Search ............... 356/243, 402, 407, 408, 356/416, 425, 430; 250/226

[56] References Cited

U.S. PATENT DOCUMENTS

| 3,756,725 | 9/1973 | Manring | 356/408 X |
| 3,890,048 | 6/1975 | Abbondio et al. | 356/425 |
| 3,995,958 | 12/1976 | Pfahl et al. | 356/408 |
| 4,003,660 | 1/1977 | Christie, Jr. et al. | 356/425 X |

Primary Examiner—F. L. Evans

[57] ABSTRACT

The invention relates to an arrangement for color detection when evaluating printed materials, maps or the like in that a color pattern under investigation is arranged substantially in the plane of a reference color pattern and both being cyclicly detected by an opto-electronic detection unit. The detector, itself consists of only one opto-electronic transducer comprising a plurality of detecting faces which receive the color informations from an illumination source reflected at both color patterns. The opto-electronic transducer is followed by an evaluation electronic means which compares the reference color pattern and the investigated color pattern and associates the respective patterns.

3 Claims, 2 Drawing Figures

ARRANGEMENT FOR COLOR DETECTION IN MAP-PLOTTING OR OTHER PRINTED MATERIALS

The invention relates to an arrangement for color detection when evaluating printed materials, maps or the like in which light is directed upon the colored matter in question for subsequent evaluation by a detecting means.

The arrangement is particularly for use in map-plotting and textile manufacture.

The evaluation of graphical pattern by means of opto-electronic detectors is disclosed in the German patent application No. 1923921.

A complete covering of the entire spectral range is achieved by employing three detectors.

The German patent applications Nos. 2559633 and 2544703 disclose a considerably simple solution for color detection, namely, a plurality of equal detectors provided with different color-filter attachments are adjacently arranged in the light reflected at the object. In a further known solution for color detection the color pattern is compared to definite voltages which correspond to respective colors.

The known devices and methods exhibit a number of disadvantages.

The optical color splitting requires considerable expenditures in equipment since each color has to be provided with an individual detector unit comprising at least an objective and a scanner.

When the color splitting has to be achieved via voltage comparison the measuring values are adulterated by voltage swing of the light source used, variations in the colors scanned, etc.

The used filters for color detection fix definite color ranges which only can be varied by high expenditures, apart from the illumination power being considerable in this case.

It is an object of the present invention to obviate the above disadvantages.

It is a further object of the invention to provide a simple and comparatively unexpensive arrangement for color detection.

It is still a further object of the invention to detect the color of an object under investigation by employment of one channel only and using a comparison method.

These and other objects are realised by an arrangement for color detection where a reference color pattern is arranged in the plane of the color pattern to be detected and both being cyclicly scanned. The light of an illumination device for scanning both patterns is directed to a detector unit being an opto-electronic transducer constituted of a plurality of detector elements followed by an electronic evaluation unit for comparing and associating, respectively, the colors of the reference pattern to the color pattern under investigation. Advantageously, the reference color pattern is attached to a glass sheet and located adjacent the color pattern under investigation for movement over the latter. Thus it is feasible to do with one detector unit comprising one objective and one sensing unit. Since color filters are eliminated a considerably lower illumination power is required. A variation of the color ranges is feasible in simply exchanging the reference color patterns. Since the color pattern under investigation is cyclically scanned a low constancy in the illumination source is required.

Figure 2:
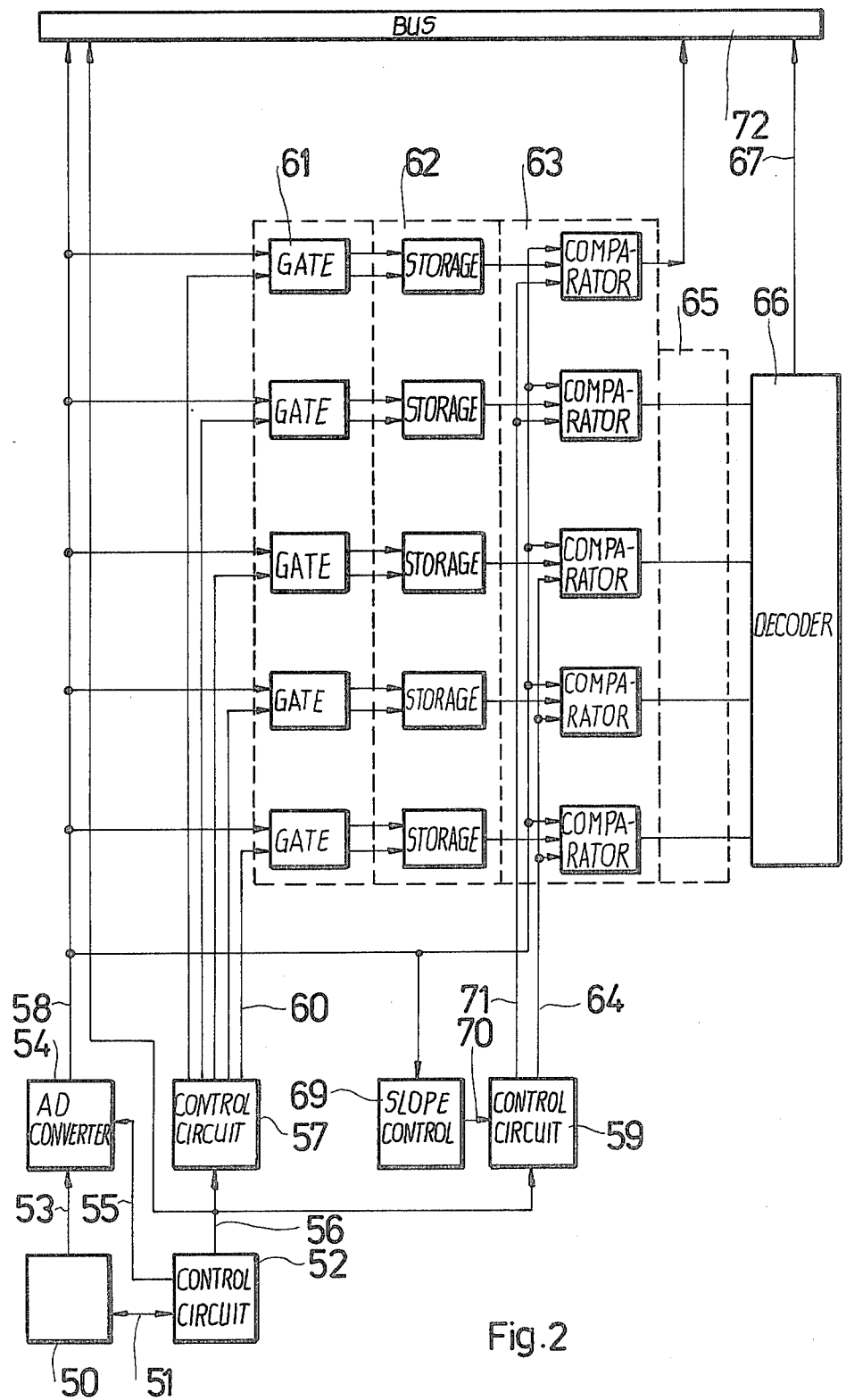

In order that the invention may be more readily understood reference is made to the accompanying drawings which illustrate diagrammatically and by way of example one embodiment thereof and where FIG. 1 is a perspective view of an opto-mechanical unit of a color detection arrangement, and FIG. 2 a block scheme of an electronic unit of the color detection unit.

In FIG. 1 an arrangement for color detection comprises an illumination source 1 having a flat coil 2, a cylinder lens 3 and a plane colored object 4 to be investigated on a scanning table 5. A glass-sheet 6 of a thickness b is arranged by a minute space relative to the colored object 4 and between the latter and the light source 1. One end portion 16 of the glass-sheet 6 projects beyond the the object 4 and is provided with a reference color pattern 7 which consists of a number of lines 17 of different colors.

The distance between the cylinder lens 3 and the flat coil 2 is s, and the colored object is s', the distances being such that related to the refractive index of the lens 3 the flat coil 2 and the surface of the colored object 4 are optically conjugate. The thickness a is the distance between the surface of the end portion of the glass-sheet 6 carrying the reference pattern 7 and the surface of the colored object 4, the mathematical relation between a and b is $a = b(n-1)$ where n is the refractive index of the glass-sheet 6.

An objective 8 is axially displaceably arranged between the surface of the colored object (pattern) 4 to be investigated and an opto-electronic transducer 50 so that the surface of the former and the surface of the opto-electronic transducer 50 opposing the objective 8 are optically conjugate relative to each other, the respective distances being $s_1$ and $s_1'$.

The scanning table 5 is displaceable in x, y direction in guides 20, 21, 22 by means of slides 23, only partially visible. On the remote side of the scanning table 5 counterparts are provided to the slide 23 and the guide 22, the latter being seated via its end portions in seatings 24, (only one visible). The guides 20, 21 are secured to the slide 23.

The displacement in x-direction becomes necessary when a light stripe 10 does not cover the entire width of the object 4 and the reference pattern 7. The opto-electronic transducer 50 includes an elongated CCD element 9 the detecting faces of which are close together separated from one another only by small non-detecting strips.

In operation, the light from the light source 1 is emitted from the flat coil 2, which is imaged through the cylinder lens 3 upon the surface of the colored pattern 4 to be investigated and upon the reference pattern 7, where it impinges as a light stripe 10. In order to have a sharp image of the light source 1 upon the surface of the reference color pattern 7 and upon the color pattern 4 being at the space a beneath the reference pattern 7 the glass-sheet 6 of a thickness b is arranged between the lens 3 and the color pattern 4, to compensate for the thickness a due to the variation in the intercept length of the lens 3 effected by said glass-sheet 6.

The objective 8 images the illuminated stripe of the reference color pattern 7 and of the color pattern 4 under investigation upon the detecting face of the CCD element 9.

The light source 1, the lens 3, the glass-sheet 6, the objective 8 and the opto-electronic transducer 50 are connected to form a unit displaceable to the scanning table 5, or vice versa.

In the course of the displacement of said unit relative to and along the surface of the scanning table 5 the CCD-detecting faces of the opto-electronic member 50 are cyclically read and in each reading cycle the reference color pattern 7 is involved. The reading speed is matched to the relative movement between the two patterns 4 and 7, on the one hand, and the said unit, on the other hand. Thus a portion of the CCD-detecting faces detects the informations from the reference color pattern 7, whereas another portion of the CCD-detecting faces detects the informations from the color pattern 4 under investigation.

In order to entirely scan a color pattern under investigation the scanning table 5 is displaced in x, y-direction.

The displacement in y-direction is always carried out about the width of one pattern line, and, when an end position is arrived at, the scanning table 5 is displaced in x-direction about the width of one line of the reference color pattern 7, then the displacement in y-direction starts again in steps as described hereinbefore.

In FIG. 2 an electronic unit for evaluating the informations obtained by the device as described in connection with FIG. 1 comprises the opto-electronic transducer 50 of FIG. 1, here in schematic representation, which includes about 256 detecting faces.

The transducer 50 is connected via a connection line 51 to a first control circuit 51 and via a connection line 53 to an A/D converter 54 for feeding analog signals into the latter.

The A/D converter 54 is controlled through the first circuit 51 via a line 55.

The digital values from the A/D converter 54 are fed via a line 58 into the gate circuits 61, the storages 62, the comparators 63, a slope control circuit 69, and into a bus unit 72. The control signals from the first control circuit 52 are fed into a second control circuit 57, and into a third control circuit 59 via lines 56. The control signals from the second control circuit 57 are fed into the gate circuits 61 via the line 60, and the control signals from the third control circuit 59 are fed into the comparators 63 via lines 71 and 64.

The informations stored in the storages 62 which are connected via their inputs to the gate circuits 61, are fed into the comparators 63 via lines 68.

The output signals from said comparators 63 are fed via lines 65 into a decoder 66 and from there via a line 67 into the data bus 72.

The first control circuit 52 controls the detection of the opto-electronic transducer 50 and the digital conversion of the obtained analog values, and provides data with a "valid" signal.

The second control circuit 57 employs the "valid" signals and the set level values of the reference color pattern 7 to control the gate circuits 61 and, hence, to store the color values in the storages 62. The control circuit 59 controls both the comparison of the stored color values of the reference color pattern 7 to the real colors obtained from the scanned color pattern 4 under use of the "valid" signals from the first control circuit 52, and the release of the respective signals after scanning the reference color pattern under use of a difference circuit. The third control circuit 59 decides whether or not a comparison has to be performed.

This program is repeated at each new scanning operation. The invention is not restricted to the above embodiment. Thus the CCD detecting line can be replaced by a matrix arrangement, which involves a respective variation of the illumination system.

The CCD detector line can be replaced by an arrangement of individual components such as phototransistors.

The illumination of the color pattern 4 and/or the reference color pattern 7 can be performed in transmitted or reflected light.

The reference color pattern 7 can be arranged in a plane optically conjugate to the color pattern 4 to be investigated remote from each other.

The cylindrical lens 3 can be replaced by a spheric lens, the illumination and imaging path can be displaced by displacing the spheric lens, or through insertion of an additional optical component, or by displacing the scanning table 5 so to produce a scanning line for the patterns 4 and 7.

We claim:

1. An arrangement for color detection in maps or similar printed material, comprising
   a scanning table,
   a first guiding means
      said scanning table being displaceably arranged upon and along said first guiding means,
   a sliding means for supporting the end portion of said first guiding means,
   a second guiding means, said sliding means being displaceably seated about said second guiding means,
   a color pattern under investigation being arranged upon said scanning table,
   a reference color pattern being arranged substantially in a plane of said color pattern under investigation adjacent the latter,
   a light source being arranged above said scanning table for slanting illumination of a portion of said color pattern under investigation and said reference color pattern, a condenser lens being arranged between said table and said light source for imaging said light source upon said color pattern under investigation,
   an opto-electronic transducer being arranged above said scanning table for separately detecting the light of said light source from said reference color pattern and from said color pattern under investigation,
      said opto-electronic transducer converting said detected light into corresponding electric signals,
   an objective being arranged between said color pattern under investigation and said transducer for imaging said portion of said color pattern under investigation and said reference color pattern upon said transducer,
      said light source, said condenser lens, said portion of said color pattern, said objective and said transducer being in optical alignment,
   electronic means for comparing and evaluating said electric signals derived from said color pattern under investigation and said reference color pattern.

2. Arrangement as claimed in claim 1, wherein said condenser lens is a cylindric lens for producing a scanning stripe extending along both, said reference color pattern and said color pattern under investigation.

3. An arrangement as claimed in claim 2, wherein said reference color pattern comprises at least three different color lines in parallel to each other and at right angles to said scanning stripe.

* * * * *